Jan. 31, 1956 E. B. CHARPIAT 2,732,977
PORTABLE CARBONATED BEVERAGE DISPENSER
Filed Jan. 19, 1950 2 Sheets-Sheet 1
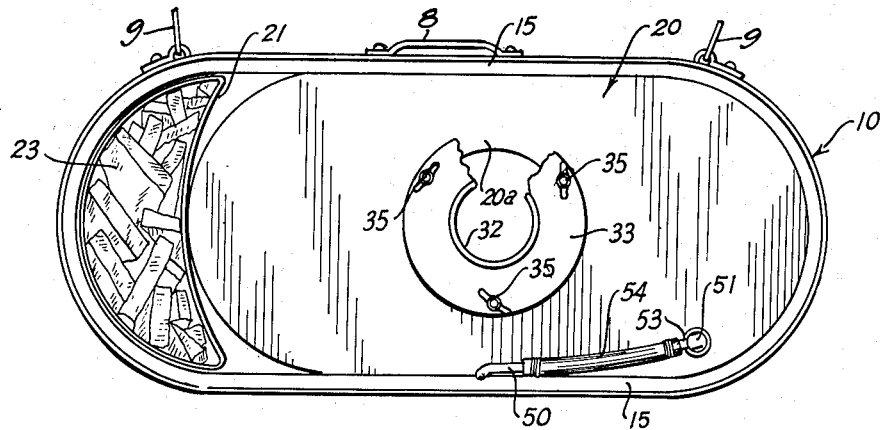
FIG. — 2
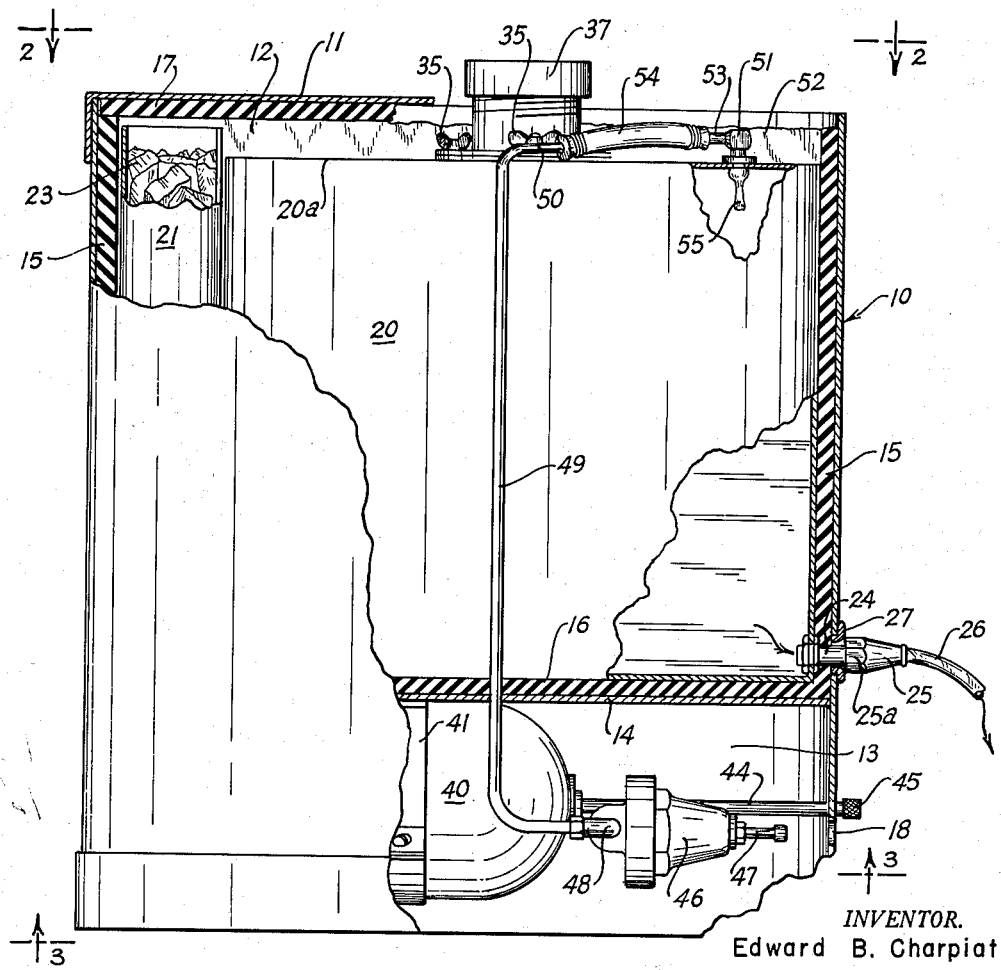
FIG. — 1
INVENTOR.
Edward B. Charpiat
BY
ATTORNEY Jan. 31, 1956   E. B. CHARPIAT   2,732,977
PORTABLE CARBONATED BEVERAGE DISPENSER
Filed Jan. 19, 1950   2 Sheets-Sheet 2
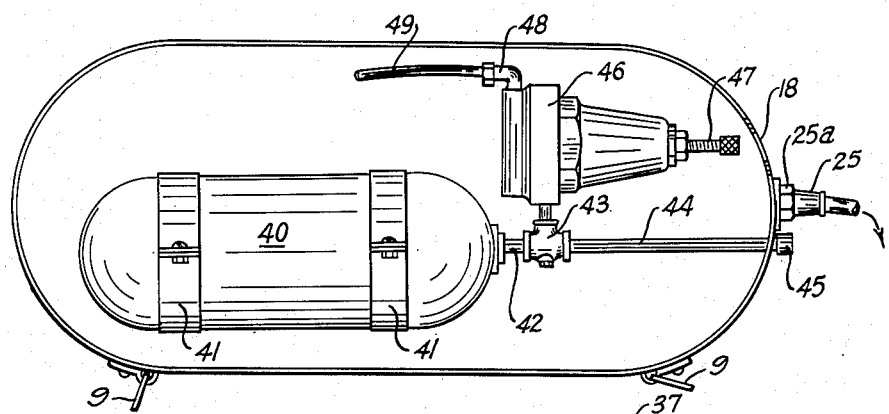
FIG.—3
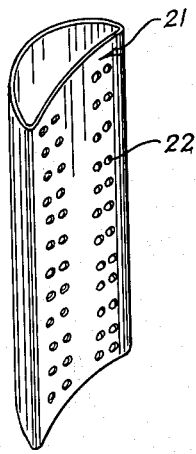
FIG.—4
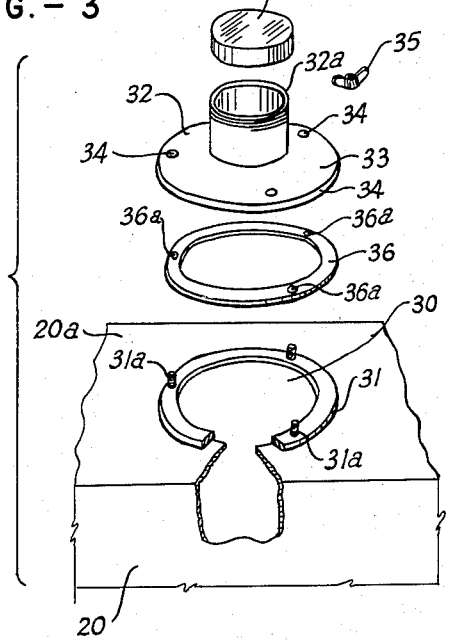
FIG.—5
*INVENTOR.*
Edward B. Charpiat
BY
ATTORNEY 2,732,977
Patented Jan. 31, 1956

UNITED STATES PATENT OFFICE 2,732,977

PORTABLE CARBONATED BEVERAGE DISPENSER

Edward B. Charpiat, Denver, Colo., assignor to The Charpiat Corporation, a corporation of Colorado Application January 19, 1950, Serial No. 139,413

3 Claims. (Cl. 222—131)

The present invention relates to portable carbonated beverage dispensers. It has to do particularly, although not exclusively, with portable dispensing containers which are capable of being transported from place to place while being suitably supported upon the back and shoulders of a vender so that the contents, such as a carbonated beverage which the container holds, may be dispensed to a customer on the spot, such as while seated in a stadium or other gathering place.

One of the objects of the present invention is to provide an improved portable and transportable carbonated beverage dispenser which maintains the carbonated beverage in the same state or condition as that which is ordinarily dispensed from a fountain or which is ordinarily bottled and dispensed in that form.

Another object of the present invention is to provide a beverage dispenser of the foregoing character which is capable of maintaining the beverage at a relatively low temperature regardless of weather conditions.

A further object of the present invention is to provide an improved structure which includes an attractive outer casing or housing, an inner tank or container which may be removed from the housing and which tank is especially built to permit access to its interior for cleaning purposes.

Another object of the present invention is to provide means for controlling the pressure of the beverage and maintaining said pressure constant, permitting its being dispensed normally without foaming.

A further object of the present invention is to provide an improved dispenser as aforesaid in which the casing or housing preferably has upper and lower separated compartments, with the upper compartment being normally closed by a removable lid or cover and with the lower end of the lower compartment preferably open to permit access to parts of the device disposed within said lower compartment; another object of the invention being to provide generally standard or conventional mechanical parts or elements of more or less standard sizes, thus permitting the ready replacement of parts or elements when and if desirable.

A further object of the present invention is to provide an improved beverage dispenser of the foregoing character, the structure including a pressure regulating valve for maintaining a substantially constant pressure within the beverage containing tank, which valve may be adjusted at will, a safety or pressure-relief valve operative under unusually high pressures, and means accessible exteriorly of the casing or housing permitting recharging of the gas tank with $CO_2$, or other suitable gas, or air under pressure.

Another object of the present invention is to provide an improved portable carbonated beverage dispenser like that described above which is of relatively simple construction and of compact nature and one which is capable of withstanding hard use over long periods of time without requiring the repair or replacement of the parts thereof.

The foregoing and other objects and advantages of the present invention will appear from the following description and appended claims when considered in connection with the accompanying drawings forming a part of this specification wherein like reference characters designate corresponding parts in the several views.

In said drawings:

Fig. 1 is a side elevational view, partly in section and partly broken away, of one embodiment of a portable carbonated beverage dispenser embodying the present invention.

Fig. 2 is a top plan view, partly broken away, of the dispenser of Fig. 1, with the lid or cover of the dispenser casing or housing removed, and taken substantially along the line 2—2 of Fig. 1, looking in the direction of the arrows.

Fig. 3 is a bottom plan view of the dispenser of Fig. 1, taken substantially along the line 3—3 of Fig. 1, looking in the direction of the arrows.

Fig. 4 is a perspective view of the refrigerant-containing removable shell-like member, shown removed from the casing; and Fig. 5 is an exploded perspective view illustrating the various parts of the detachable or removable neck unit and cap for the beverage containing tank.

Before explaining in detail the present invention it is to be understood that the invention is not limited in its application to the details of contruction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now particularly to the drawings, there is shown therein one embodiment of the improved portable and transportable carbonated beverage dispenser of the present invention. As indicated above, it is desirable that such a portable dispenser contain a beverage, such as a carbonated beverage, which is of the same consistency and which has preferably the same gaseous content as that particular beverage has when dispensed from the usual fountain having fixed or permanent apparatus or equipment, or when in bottled form. In other words, it is desirable to provide a portable dispensing container which is capable of dispensing a beverage in the proper condition and which has ample means for maintaining the beverage at a relatively low temperature so that it will be pleasing and palatable when vended. It is also desirable that such a dispensing unit be of compact nature and one whose individual units or elements may be removed from their normal positions within the casing or housing for replacement or repair and to permit the periodic cleaning of the parts.

With particular reference to Figs. 1 and 2 of the drawings, the structure of the present invention, as shown, includes a casing or housing 10 preferably having a removable lid or cover 11. As seen in Fig. 1, the casing or housing provides an upper chamber or compartment 12 and a lower chamber or compartment 13, the upper compartment being in height considerably greater than that of the lower compartment. These compartments are provided by means of a horizontal or transversely extending wall or partition 14. Thus, when the cover 11 is in place, the upper compartment 12 is closed. It is to be noted, however, that the lower compartment 13 is preferably open at its bottom.

The shape of the casing or housing may vary but it is preferable at the present time to provide one which is of generally oval cross section as will be readily appreciated by viewing Figs. 2 and 3. Since one use for the present dispensing structure is by venders who carry it on their backs, being preferably suspended by means of flexible harness or strap-like members (not shown) from the shoulders of the vender, it is desirable that the casing have a greater length from side to side than width so as to provide a broad surface adjacent the back of the vender. While providing such relatively broad surface, the casing does not, however, project outwardly very far from the back of the vender since its dimension from front to back is considerably less than its end to end dimension. Suitable means, such as a strap-like plate 8, Fig. 2, and rings or eyes 9, Figs. 2 and 3, are provided for attaching the flexible harness to the casing 10.

To provide for maintaining the beverage to be dispensed at a relatively low temperature, the upright side or front and back walls, and the end walls of the casing or housing within the upper compartment 12 are provided with suitable rubber insulation, said rubber being of any desirable type, such as sponge rubber or foam rubber. While it seems desirable at the moment to employ rubber as an insulating material, the same being secured to the inner faces or surfaces of the walls by cement, or in any other suitable manner, various other and different materials may be employed for insulating purposes. It is to be noted that in addition to the insulating material 15 for the upright walls, the horizontal wall or partition 14 is likewise provided on its inner face with a layer or piece of similar insulation 16. The removable lid or cover 11 also carries on its inner face similar insulation 17. Thus, when the lid or cover 11 is in place, the upper compartment 12 is substantially completely insulated against the escape of cold from within and the entry of heat from without the casing.

It is to be understood that the cover or closure member 11 is provided with an opening surrounding the neck and closure cap of the beverage containing tank to be later described and that one end wall of the casing 10 is provided with an access opening 18, see Fig. 1.

The upper compartment 12 is adapted to receive and support a beverage containing tank 20 which tank is of generally oval cross section, thus corresponding to the cross sectional shape of casing 10 but on a somewhat smaller scale as to height, length and width. Tank 20 rests upon the insulating layer 16 and is thus supported by said layer in spaced relationship to wall or partition 14. One end wall of the tank engages the insulation 15 at one end of the casing and its side walls contact similar insulation on the side walls of the casing, as will be readily apparent from an examination of Fig. 2.

Located also within the upper compartment and disposed at one end of tank 20, is a removable shell-like basket or container for holding ice, dry ice, or some other suitable chilling or cooling medium. The shell-like member is shown as a whole at 21 and is preferably of generally half moon shape in horizontal cross section, with the front or inner wall being provided with a series of perforations or openings 22. The bottom of member 21 is closed but the top thereof is open to receive chunks of ice, dry ice, or the like 23. When the removable basket-like member 21 is in position, it will be noted that its perforated inner face or wall is disposed adjacent to the inner upright end wall of tank 20. Thus, cold emitted by the material 23 is free to pass through the perforations 22 and contact the tank wall 20. By virtue of the space above and around tank 20 and between it and the lid or cover insulation 17, cold air is free to circulate over and around a large portion of the beverage containing tank 20 for the purpose of chilling the liquid contents of the tank and/or for maintaining it in chilled condition.

The so-called outer end wall of tank 20 is preferably tapped adjacent the bottom thereof to receive and support a short length of pipe 24 which is threaded at its outer end to receive a fitting 25 carried by a length of flexible conduit or tubing 26. Fitting 25 is preferably provided with a hexagonal surface or portion 25a to permit it to be applied to and removed from pipe 24. It is to be noted that pipe 24 extends through insulating material 15 and outwardly through a grommet 27 positioned in an opening formed in the upright end wall of tank 10. When the parts are tightened together, the tank 20 will be firmly supported in position within the upper compartment 12. When, however, it is desirable to remove the tank from within the compartment, fitting 25 is freed from pipe 24, whereupon the tank can be lifted out of the compartment.

With particular reference now to Figs. 1, 2 and 5, it is to be noted that the upper end or top wall 20a of beverage containing tank 20 is provided with a centrally disposed opening 30 which is surrounded by a permanently attached ring member 31. The ring member 31 provides a base or supporting surface for the flanged portion or base 33 of a removable filler device or neck unit 32. Neck portion 32 is exteriorly threaded at 32a and has a flange or annular base 33 which is provided with spaced holes or openings 34 to receive bolts or studs 31a to which are applied wing nuts 35. It is to be noted also that the base or permanent ring member 31 on the tank carries the spaced studs or bolts 31a and that an intermediate sealing ring or gasket 36 is provided which likewise has formed therein spaced holes or openings 36a. In assembling the neck unit, gasket or washer 36 is placed upon the permanent ring 31 with the holes receiving studs 31a, after which base portion or flange 33 of the neck unit is placed upon gasket 36, with the openings or holes 34 also aligned with and receiving studs 31a. The upstanding threaded lugs or bolts 31a, as stated above, are preferably carried by the fixed ring member 31 to permit the holes in the stacked members or parts to be properly positioned over the studs. They may, however, be separate bolts or stud members, or some other suitable and expansible fastening means. After the members 36 and 33 have been properly aligned and associated with one another and with the ring 31 and studs 31a, the wing nuts 35 are applied to the outwardly projecting ends of the studs or bolts and tightened down to make a tight joint or fitting between the removable neck assembly and the top wall 20a of the tank. The tank, as shown, is provided with a removable screw threaded cap or closure member 37 which normally remains in position upon the neck, as seen in Fig. 1 of the drawings to close and seal the tank.

In a dispensing device in accordance with the present invention, it is desirable to maintain a preferably constant pressure within tank 20 so that the beverage within said tank will remain of a more or less constant consistency and therefore be capable of being drawn off or dispensed without any danger of foaming. For this purpose there is provided within the lower compartment 13, a gas-containing or air under pressure-containing tank or cylinder, shown as a whole at 40 in Figs. 1 and 3. Gas tank 40 is of standard construction and is preferably held to the under side of partition 17 by a pair of spaced divided strap-like members or clamps 41. This permits the easy removal of the tank 40 when and if desired. Tank 40 contains, preferably, $CO_2$ at a pressure of preferably 120 pounds. Connected to tank 40 is a short length of pipe 42 which leads into a fitting containing a safety valve assembly, shown as a whole at 43. A somewhat longer pipe 44 extends outwardly from the fitting and projects through an opening formed in the adjacent upright end wall of casing 10, the pipe having exteriorly of said wall, a removable and preferably knurled closure cap 45. Gas tank 40 is also connected with a pressure control valve assembly 46 of standard or conventional structure which is capable of being adjusted for various pressure controls by means of a threaded rod or adjusting screw 47, the outer end of the screw preferably being provided with a screwdriver slot. The adjusting screw 47 is accessible through opening 18 in the casing wall. If desirable, however, the adjusting member 47 may have, in place of the screwdriver slot, either an internal hex head or an external hex head or outer extremity which is capable of being reached through opening 18 by a suitable wrench or other tool. Thus, it is possible to adjust the pressure control valve assembly 46 so as to vary the pressure which is allowed to pass from gas or air tank 40 into the beverage to thereby regulate or control the pressure of said beverage.

The control valve assembly 47 has an elbow fitting 48, see Figs. 1 and 3, to which is attached, in any suitable manner, a length of tubing or pipe line 49 which extends upwardly through an opening in partition 14, along a side wall of beverage containing tank 20, and terminates in an angularly bent end portion 50 which overlies or is disposed adjacent the top wall 20a of the beverage tank. The tank wall 20a carries an L-shaped fitting, shown as a whole at 51, which has a nipple portion extending into tap 20 and a knurled portion 52 to permit attachment and removal of the member to the tank wall. A short length of pipe or tubing 53 extends outwardly from the knurled portion 52 of the fitting and a short length of flexible hose or tubing 54 is secured thereto, the opposite end of the tube 54 being attached to portion 50 of the gas line.

The nipple which extends into the tap from fitting 51 carries a rubber check valve of conventional structure, shown at 55. The purpose of this check valve is to expand to permit the entry of gas from pipe line 49, 50 into tank 20 and to collapse after the pressure has been equalized within the tank, to prevent the escape of pressure from the tank.

In accordance with the present structure, the regulating valve 46 is set for a given pressure. Therefore, when the pressure within the tank 20 falls below the set pressure, additional gas, such as $CO_2$, flows from tank 40 through the connections previously mentioned and discharges through rubber check valve 55 into tank 20 to build up the pressure to normal. When the normal pressure has been reached the pressure control valve cuts off and the rubber valve collapses to prevent further escape. This building up of pressure is necessitated, of course, by withdrawal of the beverage from the tank 20 through the flexible dispensing tube or conduit 26 which preferably carries at its outer end, a manually controlled dispensing tap or faucet (not shown).

By virtue of the provision of the pressure regulating means herein shown and described, the beverage within dispensing tank 20 will be maintained at a constant or normal pressure at all times, regardless of the quantity of beverage remaining in tank 20.

It will be understood that it is not necessary to remove the gas-containing tank 40 for recharging it. On the contrary, the closure member 45 on pipe 44 is merely removed and a tap (not shown) but which is connected with a source of gas supply or air under pressure supply, is applied to pipe 44 to recharge tank 40.

The safety valve assembly 43 is provided for the purpose of preventing any damage occurring through the accidental building up of excess or too high pressure. Assuming that the charge in tank 40 has a pressure of approximately 120 pounds, the safety valve 43 is preferably set to discharge at, for example, a pressure poundage of approximately 125 or 130 pounds. Therefore, regardless of the pressure from the supply line which is tapped into filler pipe 44, the pressure of the gas admitted cannot exceed 125 to 130 pounds, for example.

It will, of course, be appreciated that any suitable cooling medium may be employed in the basket-like container 21, although Dry Ice seems at the present time to be the most practical for this purpose.

The pressure of the beverage within the container may vary but it has been found desirable to maintain it at about 45 pounds. This is usually the pressure which is maintained in the beverage in its large and permanently positioned storage tanks in the plant of the supplier or dispenser. Therefore, when it is desirable to refill tank 20, the cap 37 is removed and the beverage under 45 pounds is admitted.

It is desirable to be able to clean thoroughly the inner surfaces of tank 20. Therefore, the detachable and separable neck assembly, shown in detail in Fig. 5 of the drawings, has been evolved to permit this.

I claim:

1. A back-supported portable dispenser for carbonated beverages and the like, comprising a casing having external means for attaching the dispenser to a flexible harness for supporting said dispenser on the back of a user, said casing also having an upper compartment and a lower compartment, an insulated dividing wall between and separating the compartments, a beverage containing tank disposed within the upper compartment, said tank having a removable flanged threaded neck mounted upon its top wall, means for attaching the neck to said wall and a removable cap for the neck, means also within the upper compartment for chilling the beverage within the tank, a gas pressure tank located within the lower compartment, a conduit connecting the gas pressure tank with the beverage containing tank above the level of the beverage therein for maintaining the beverage at a predetermined pressure, means for dispensing the contents of the beverage containing tank, a charging conduit extending from the gas pressure tank through a wall of the lower compartment and accessible from outside the casing, and a pressure regulator for the gas disposed between the two tanks and accessible through a wall of said casing at a point below the dividing wall.

2. A back-supported portable dispenser for carbonated beverages and the like, comprising a casing having external means for attaching the dispenser to a flexible harness for supporting said dispenser on the back of a user, said casing also having an upper compartment and a lower compartment, an insulated dividing wall between and separating the compartments, a beverage containing tank disposed within the upper compartment, said tank having a removable flanged threaded neck, means engaging the flange to removably attach the neck to the wall and a removable threaded cap for the neck, means also within the upper compartment and extending at least the full height of said tank for chilling the beverage within the tank, a gas pressure tank located within the lower compartment, a conduit connecting the gas pressure tank with the upper portion of the beverage containing tank above the level of the beverage therein for maintaining the beverage at a predetermined pressure, means for dispensing the contents of the beverage containing tank, a charging conduit extending from the gas pressure tank through a wall of the lower compartment and accessible from outside the casing, a pressure regulator for the gas disposed in the conduit connecting the two tanks and having adjusting means accessible through a wall of the casing, and a safety valve disposed between the gas pressure tank and said pressure regulator.

3. A back-supported portable dispenser for carbonated beverages and the like, comprising a casing having external means for attaching the dispenser to a flexible harness for supporting said dispenser on the back of a user, said casing also having an upper compartment and a lower compartment, an insulated dividing wall between and separating said compartments, said casing having straight parallel front and back walls and semi-circular end walls, a beverage containing tank disposed within the upper compartment, means also within the upper compartment for chilling the beverage within the tank, a gas pressure tank located within the lower compartment, a conduit connecting the gas pressure tank with the beverage containing tank above the level of the beverage therein for maintaining the beverage at a predetermined pressure, and means for dispensing the contents of the beverage containing tank, said beverage chilling means comprising a removable shell-like container having a perforated wall toward said beverage containing tank and having a height at least as great as the height of the beverage containing tank.

References Cited in the file of this patent

UNITED STATES PATENTS

| | | |
|---|---|---|
| 745,876 | Medley | Dec. 1, 1903 |
| 1,637,635 | Corley | Aug. 2, 1927 |
| 1,969,960 | Blum | Aug. 14, 1934 |
| 1,979,323 | Felesina et al. | Nov. 6, 1934 |
| 2,045,009 | Ehle | June 23, 1936 |
| 2,057,068 | Speer | Oct. 13, 1936 |
| 2,105,339 | Sweitzer | Jan. 11, 1938 |
| 2,620,107 | Tolan | Dec. 2, 1952 |